(12) United States Patent
Inagaki

(10) Patent No.: US 7,067,099 B2
(45) Date of Patent: Jun. 27, 2006

(54) METHOD FOR PREPARING ALUMINUM SULFATE, ALUMINUM SULFATE, METHOD FOR IMPROVING YIELD OF ALUMINUM SULFATE, AND USE OF NITRIC ACID

(75) Inventor: Yasuhito Inagaki, Kanagawa (JP)

(73) Assignee: Sony Corporation (JP)

( * ) Notice: Subject to any disclaimer, the term of this patent is extended or adjusted under 35 U.S.C. 154(b) by 218 days.

(21) Appl. No.: 10/298,525

(22) Filed: Nov. 19, 2002

(65) Prior Publication Data

US 2003/0103891 A1    Jun. 5, 2003

(30) Foreign Application Priority Data

Nov. 21, 2001 (JP) ............ P2001-356385
Nov. 21, 2001 (JP) ............ P2001-356386
Nov. 21, 2001 (JP) ............ P2001-356387

(51) Int. Cl.
C01F 7/74 (2006.01)
C02F 1/52 (2006.01)

(52) U.S. Cl. .............. 423/556; 423/128; 423/DIG. 2

(58) Field of Classification Search ........... 423/556, 423/128, DIG. 2
See application file for complete search history.

(56) References Cited

U.S. PATENT DOCUMENTS

| 2,844,439 | A | * | 7/1958 | Schurr | 423/115 |
| 5,348,724 | A | * | 9/1994 | Hagimori et al. | 423/531 |
| 5,350,511 | A |   | 9/1994 | Sakurada | 210/199 |
| 5,356,602 | A | * | 10/1994 | Tanjo et al. | 423/128 |
| 5,549,833 | A | * | 8/1996 | Hagimori et al. | 210/757 |
| 5,614,102 | A | * | 3/1997 | Sakurada | 210/718 |
| 5,942,199 | A | * | 8/1999 | Jokinen et al. | 423/122 |

FOREIGN PATENT DOCUMENTS

| EP | 0 801 029 | 10/1997 |
| JP | 54-106098 | 8/1979 |
| JP | 5-279021 | * 10/1993 |
| JP | 7-25541 | 3/1995 |
| JP | 11-267408 | 10/1999 |

OTHER PUBLICATIONS

Raw Machine Translation of JP 5-279021 (published Oct. 1993), cited above.*
Raw Machine Translation of JP 7-10536 (published Jan. 1995), cited on enclosed PTO-1449.*
Full English Translation of JP 5-279021, published Oct. 1993.*
Full English Translation of JP 7-10536, published Jan. 1995.*
Raw Machine Translation of JP 11-267408, published Oct. 1999.*
EPO Search Report Apr. 11, 2003, for EP applicaton No. 02 29 2887.

* cited by examiner

Primary Examiner—Stanley S. Silverman
Assistant Examiner—Ardith E. Hertzog
(74) Attorney, Agent, or Firm—Rader,Fishman,& Grauer, PLLC; Ronald P. Kananen

(57) ABSTRACT

A method for preparing aluminum sulfate which comprises subjecting sulfuric acid and aluminum hydroxide to reaction, wherein the reaction is advanced in the presence of at least one member selected from the group consisting of nitric acid and a peroxide. An industrial composition comprising aluminum sulfate. By the method of the present invention, aluminum sulfate can be efficiently and commercially advantageously prepared. Further, the industrial composition of the present invention can be advantageously used in various industrial fields as, for example, a waste water treatment agent, a paper sizing agent, a tanning agent for hides, a clarifying agent for fats and oils, or a catalyst for industrial use.

14 Claims, 2 Drawing Sheets

F I G. 1
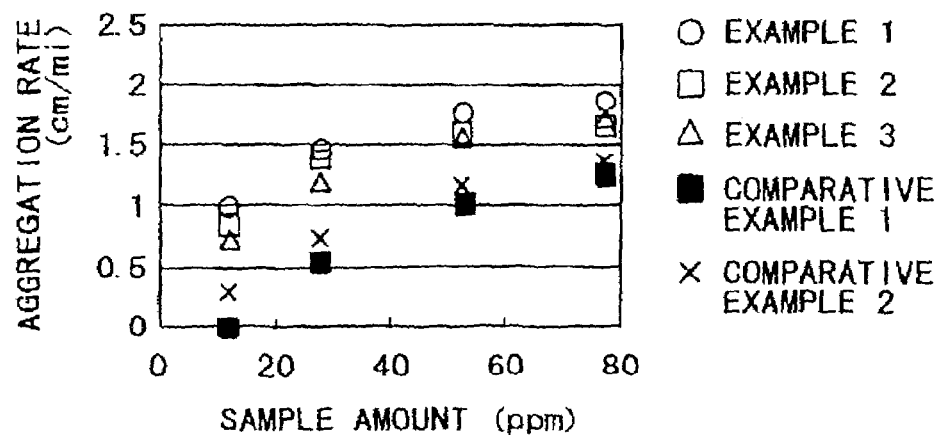
F I G. 2
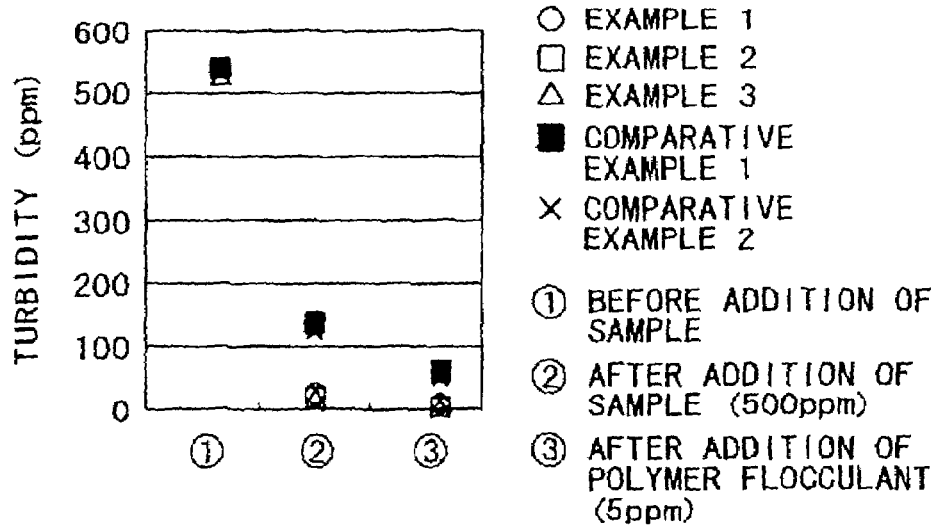

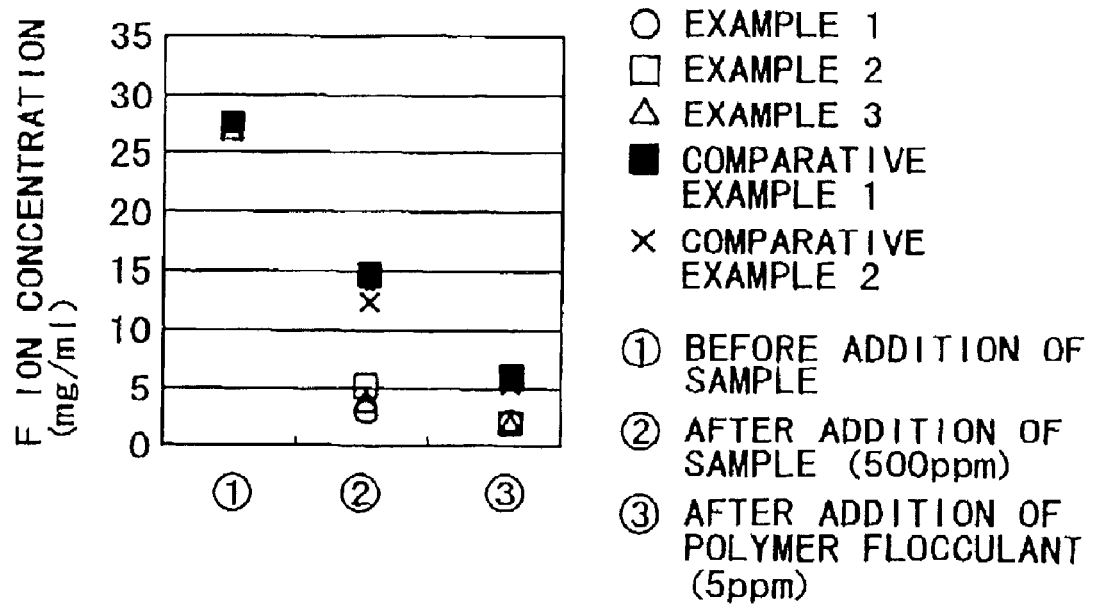

METHOD FOR PREPARING ALUMINUM SULFATE, ALUMINUM SULFATE, METHOD FOR IMPROVING YIELD OF ALUMINUM SULFATE, AND USE OF NITRIC ACID

CROSS REFERENCES TO RELATED APPLICATIONS

The present document is based on Japanese Priority Documents JP 2001-356385, JP 2001-356386, JP 2001-356387, all filed in the Japanese Patent Office on Nov. 21, 2001, the entire contents of which are being incorporated herein by reference.

BACKGROUND OF THE INVENTION

1. Field of the Invention

The present invention relates to a technique for improving a yield of aluminum sulfate in a preparation of aluminum sulfate. In addition, the present invention relates to an industrial composition comprising aluminum sulfate, which can be advantageously used as a wastewater treatment agent, a paper sizing agent, a tanning agent for hides, a clarifying agent for fats and oils, or a catalyst for industrial use.

2. Description of Related Art

Aluminum sulfate is an industrial chemical widely used as a treatment agent (inorganic flocculant) for sewerage, wastewater from plants and wastewater from water supply, a paper sizing agent, a tanning agent for hides, a clarifying agent for fats and oils, or a variety of catalysts.

Aluminum sulfate is generally produced by a method in which sulfuric acid is charged into a reaction vessel made of heat resistant, acid resistant materials, aluminum hydroxide is added to the sulfuric acid and heated, then the resultant aluminum sulfate solution having a high concentration is diluted with water, stored in the reaction vessel and cooled, followed by adjustment of the concentration, thus obtaining aluminum sulfate as a product (see Unexamined Japanese Patent Application Laid-Open Specification No. 54-106098 and Examined Japanese Patent Application Publication No. 7-25541).

However, the above conventional method for producing aluminum sulfate requires heating of the reaction system to about 100 to 130° C. and maturing of the reaction mixture for several tens minutes to about 2 hours. Further, for promoting the reaction, sulfuric acid of reagent grade having a high concentration (90 to 98% by weight) is inevitably used. Generally, waste sulfuric acid from semiconductor plants has a sulfuric acid concentration of about 70 to 90% by weight. Therefore, when it is attempted to utilize waste sulfuric acid effectively, the development of a method which can produce aluminum sulfate efficiently from sulfuric acid having a lower concentration is desired.

On the other hand, when aluminum sulfate is used as the above-mentioned wastewater treatment agent, it has a problem that aluminum sulfate containing no other chemicals in a large amount cannot exhibit a satisfactory aggregation rate, as compared to other treatment agents, for example, poly-aluminum chloride (PAC). Therefore, recently, PAC is frequently used instead of aluminum sulfate, but aluminum sulfate has an advantage in that waste sulfuric acid can be used as a raw material therefor. Thus, from the viewpoint of achieving effective utilization of waste materials (saving of materials), it has been strongly desired to develop aluminum sulfate having an aggregation performance comparable to or more excellent than that of PAC.

SUMMARY OF THE INVENTION

The present invention is conceived in view of the above technical background. It is desirable to provide a method which can prepare aluminum sulfate efficiently at a lower temperature in a shorter time from sulfuric acid having a lower concentration without using a heating source.

In addition, it is desirable to provide a composition comprising aluminum sulfate, which is more excellent than the conventional aluminum sulfate, and which has an aggregation performance comparable to or more excellent than that of PAC.

An inventor of the present invention has made extensive and intensive studies with a view toward achieving the above-mentioned needs. As a result, it has been found that, in the preparation of aluminum sulfate by subjecting sulfuric acid and aluminum hydroxide to a reaction, by advancing the reaction in the presence of at least one member selected from the group consisting of nitric acid and a peroxide, the reaction is promoted.

Further, it has been found that, when nitric acid is present in aluminum sulfate, the aluminum sulfate is improved in aggregation performance.

The present inventor has conducted further studies and thus completed the present invention.

Specifically, a first embodiment according to the present invention is directed to: (1) a method for preparing aluminum sulfate which comprises subjecting sulfuric acid and aluminum hydroxide to a reaction, wherein the reaction is advanced in the presence of nitric acid; (2) the method according to item (1) above, wherein the reaction is advanced in the presence of further hydrogen peroxide solution; (3) the method according to item (1) above, wherein the nitric acid is present in the reaction system in an amount of 1 to 3,000 ppm, based on the weight of the reaction system; (4) the method according to item (1) above, wherein the sulfuric acid is sulfuric acid containing nitric acid; (5) the method according to item (1) above, wherein the sulfuric acid is sulfuric acid containing 10 to 5,000 ppm of nitric acid; (6) the method according to item (1) above, wherein the sulfuric acid is concentrated sulfuric acid having a concentration of 50 to 90% by weight; (7) the method according to item (1) above, wherein the sulfuric acid is spent sulfuric acid that has been used for a certain purpose; (8) the method according to item (1) above, wherein the aluminum hydroxide is spent aluminum hydroxide that has been used for a certain purpose; (9) the method according to item (1) above, wherein the nitric acid is spent nitric acid that has been used for a certain purpose; (10) aluminum sulfate that is obtained by subjecting sulfuric acid and aluminum hydroxide to reaction in the presence of nitric acid; (11) a method for improving a yield of aluminum sulfate in a preparation of aluminum sulfate from sulfuric acid and aluminum hydroxide, wherein the method comprises using nitric acid; (12) use of nitric acid for improving an efficiency of a preparation of aluminum sulfate by subjecting sulfuric acid and aluminum hydroxide to reaction; (13) an industrial composition comprising aluminum sulfate that is obtained by subjecting sulfuric acid and aluminum hydroxide to a reaction in the presence of nitric acid; (14) the industrial composition according to item (13) above, which is a wastewater treatment agent; and (15) a wastewater treatment apparatus using an industrial composition which comprises aluminum sulfate obtained by subjecting sulfuric acid and aluminum hydroxide to a reaction in the presence of nitric acid.

In addition, a second embodiment according to the present invention is directed to: (1) a method for preparing aluminum sulfate which comprises subjecting sulfuric acid and aluminum hydroxide to a reaction, wherein the reaction is advanced in the presence of a peroxide in an amount of 0.1% by weight or more, based on the weight of the reaction system; (2) the method according to item (1) above, wherein the peroxide is hydrogen peroxide; (3) the method according to item (2) above, wherein the hydrogen peroxide is hydrogen peroxide solution; (4) the method according to item (3) above, wherein the reaction is advanced in the presence of further nitric acid; (5) the method according to item (3) above, wherein the hydrogen peroxide solution is present in the reaction system in an amount of 0.1% by weight or more, based on the weight of the reaction system; (6) the method according to item (3) above, wherein the sulfuric acid is sulfuric acid containing 0.2% by weight or more of hydrogen peroxide solution; (7) the method according to item (1) above, wherein the sulfuric acid is sulfuric acid having a concentration of 50 to 90% by weight; (8) the method according to item (1) above, wherein the sulfuric acid is spent sulfuric acid that has been used for a certain purpose; (9) the method according to item (1) above, wherein the aluminum hydroxide is spent aluminum hydroxide that has been used for a certain purpose; (10) the method according to item (1) above, wherein the hydrogen peroxide solution is spent hydrogen peroxide solution that has been used for a certain purpose; (11) aluminum sulfate which is obtained by subjecting sulfuric acid and aluminum hydroxide to a reaction in the presence of a peroxide; (12) a method for improving the yield of aluminum sulfate in preparation of aluminum sulfate from sulfuric acid and aluminum hydroxide, wherein the method comprises using hydrogen peroxide solution; (13) use of a peroxide for improving an efficiency of the preparation of aluminum sulfate by subjecting sulfuric acid and aluminum hydroxide to reaction; (14) an industrial composition comprising aluminum sulfate that is obtained by subjecting sulfuric acid and aluminum hydroxide to a reaction in the presence of a peroxide; (15) the industrial composition according to item (10) above, which is a wastewater treatment agent; and (16) a wastewater treatment apparatus using an industrial composition which comprises aluminum sulfate obtained by subjecting sulfuric acid and aluminum hydroxide to a reaction in the presence of a peroxide.

Further, a third embodiment according to the present invention is directed to: (1) an industrial composition comprising nitric acid and aluminum sulfate; (2) the industrial composition according to item (1) above, which has a nitric acid content of 10 to 2,000 ppm, based on the weight of the aluminum sulfate, in terms of liquid aluminum sulfate having an $Al_2(SO_4)_3$ content of 26.8% by weight; (3) the industrial composition according to item (1) above, wherein the nitric acid is spent nitric acid that has been used for a certain purpose; (4) the industrial composition according to item (1) above, wherein the aluminum sulfate is crude aluminum sulfate prepared from spent sulfuric acid and nitric acid that have been used for a certain purpose; (5) the industrial composition according to item (1) above, which is a wastewater treatment agent; (6) the industrial composition according to item (1) above, which is a paper sizing agent, a tanning agent for hides, a clarifying agent for fats and oils, or a catalyst for industrial use; (7) a method for treating wastewater, comprising using a composition which comprises nitric acid and aluminum sulfate; and (8) a wastewater treatment apparatus using an industrial composition which comprises nitric acid and aluminum sulfate.

According to the present invention, aluminum sulfate can be prepared efficiently using, as a raw material, sulfuric acid having a concentration as low as about 50 to 90% by weight, such as waste sulfuric acid from semiconductor plants.

When nitric acid or a peroxide, such as hydrogen peroxide solution, is present in the reaction system, the reaction is promoted, as compared to the reaction in a conventional method, and the temperature of the reaction system reaches the maximum temperature in a shorter time to complete the reaction. Therefore, the throughput capacity can be improved, the energy required for heating can be reduced to save energy, and further, the amount of the unreacted substance can be reduced to improve the product quality. That is, by advancing the reaction in the presence of nitric acid or a peroxide, such as hydrogen peroxide solution, the efficiency of the preparation of aluminum sulfate can be improved.

The aluminum sulfate prepared by the method for preparing aluminum sulfate of the present invention can be used in the form of an industrial composition as a treatment agent for sewerage, wastewater from plants and wastewater from a water supply, a paper sizing agent, a tanning agent for hides, a clarifying agent for fats and oils, or a variety of catalysts.

The aluminum sulfate composition containing nitric acid of the present invention exhibits a more excellent aggregation performance than that of PAC.

Further, in the present invention, waste sulfuric acid and waste nitric acid can be used to achieve effective utilization of waste materials.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 1 is a graph showing a comparison with respect to the aggregation rate between the compositions in Examples 1 to 3 and Comparative Examples 1 and 2 of the third embodiment of the present invention;

FIG. 2 is a graph showing a comparison with respect to the turbidity between the compositions in Examples 1 to 3 and Comparative Examples 1 and 2 of the third embodiment of the present invention; and FIG. 3 is a graph showing a comparison with respect to the F ion concentration between the compositions in Examples 1 to 3 and Comparative Examples 1 and 2 of the third embodiment of the present invention.

DESCRIPTION OF THE PREFERRED EMBODIMENTS

With respect to the concentration of the sulfuric acid used in each of the first embodiment, the second embodiment, and the third embodiment of the present invention, there is no particular limitation, and sulfuric acid having a concentration of about 90% by weight or less can be satisfactorily used, and generally, it is preferred that the sulfuric acid have a concentration of about 50% by weight or more. The sulfuric acid used in a conventional method generally has a concentration of 90% by weight or more. With respect to the quality of the sulfuric acid used in the present invention, the sulfuric acid may be of industrial grade or reagent grade; high-purity sulfuric acid used in the semiconductor industries; sulfuric acid that has been used as a cleaning agent for various parts and products, particularly as a resist removing agent or a cleaning agent in the semiconductor fabrication process; or fuming sulfuric acid, sulfuric anhydride, or waste thereof. From the viewpoint of achieving an effective utilization of waste materials and reduction of the production cost, it is desired to use waste (spent) sulfuric acid that has been used for a certain purpose.

The spent sulfuric acid that has been used for a certain purpose includes waste liquid containing sulfuric acid and waste sulfuric acid.

The aluminum hydroxide used in each of the first embodiment, the second embodiment, and the third embodiment of the present invention may be aluminum hydroxide for industrial use that is used as a raw material for aluminum salts, pottery, glass, refractory, catalysts or catalyst carriers, resins, rubbers, paper fire retardants, and artificial marble, high-purity aluminum hydroxide used as a raw material for IC or optical glass, a raw material for high-purity aluminum compounds, for catalyst use, and for medical use, or waste of the above materials containing aluminum hydroxide (spent materials). From the viewpoint of achieving a reduction of the production cost and an effective utilization of waste materials, it is more preferred to use, as a raw material, aluminum hydroxide for industrial use or spent aluminum hydroxide that has been used for a certain purpose.

The spent aluminum hydroxide that has been used for a certain purpose includes waste materials containing aluminum hydroxide.

With respect to the concentration and quality of the nitric acid used in each of the first embodiment, the second embodiment, and the third embodiment of the present invention, the nitric acid may be of a reagent grade or an industrial grade, waste liquid containing nitric acid that has been used for a certain purpose, for example, a resist removing agent or a cleaning agent in organic synthesis or semiconductor fabrication; or fuming nitric acid or waste thereof. From the viewpoint of achieving effective utilization of waste materials and a reduction of the production cost, it is desired to use waste (spent) nitric acid that has been used for a certain purpose. Alternatively, nitric acid contained in the above-mentioned sulfuric acid may be utilized. For example, as proposed in Unexamined Japanese Patent Application Laid-Open Specification Nos. 11-157812 and 11-319849, nitric acid that is added to waste sulfuric acid for decomposing hydrogen peroxide in the waste sulfuric acid, that is, nitric acid contained in the waste sulfuric acid can be utilized.

The spent nitric acid that has been used for a certain purpose includes waste liquid containing nitric acid and waste nitric acid.

With respect to the concentration and quality of the peroxide, e.g., hydrogen peroxide solution, used in each of the first embodiment, the second embodiment, and the third embodiment of the present invention, the peroxide may be of a reagent grade or industrial grade or waste liquid containing (spent) hydrogen peroxide solution that has been used for a certain purpose, for example, a peroxide, such as, hydrogen peroxide solution contained in waste sulfuric acid used as a cleaning agent for removing resists in semiconductor fabrication plants. From the viewpoint of achieving an effective utilization of waste materials and a reduction of the production cost, it is more desirable to use as a raw material, a peroxide, e.g., a hydrogen peroxide solution contained in waste sulfuric acid.

The spent hydrogen peroxide solution that has been used for a certain purpose includes waste liquid containing a peroxide, such as hydrogen peroxide solution, and hydrogen peroxide solution contained in waste sulfuric acid.

In the first embodiment of the present invention, if desired, aluminum sulfate can be prepared from the above-mentioned sulfuric acid, aluminum hydroxide, and nitric acid as raw materials, in the presence of other additives, for example, water in the reaction system. The reaction may be conducted in accordance with substantially the same procedure as in the known method for preparing aluminum sulfate, except that nitric acid is present in the reaction system, and aluminum hydroxide in the form of powder or in the form of slurry in water may be added to sulfuric acid. Alternatively, sulfuric acid may be added to a slurry of aluminum hydroxide and water. Nitric acid may be added to the reaction system either before initiating the reaction or during the reaction. Alternatively, nitric acid may be preliminarily added to sulfuric acid, water, or a slurry of aluminum hydroxide and water and then used. The recycled sulfuric acid according to the above-mentioned descriptions of Unexamined Japanese Patent Application Laid-Open Specification Nos. 11-157812 and 11-319849 contains nitric acid. When this sulfuric acid is used as a raw material for aluminum sulfate, nitric acid can be present in the reaction system. In the first embodiment of the present invention, it is preferred that the reaction is advanced while adding dropwise sulfuric acid to a mixture of aluminum hydroxide and nitric acid.

The amount of the nitric acid added to the reaction system may be about 1 to 3,000 ppm, preferably about 10 to 1,000 ppm, based on the weight of the reaction system. When the amount of the nitric acid added is smaller than about 1 ppm, it is difficult to obtain a satisfactory reaction promotion effect. On the other hand, an amount of the nitric acid added larger than 3,000 ppm is disadvantageous from an economical point of view.

In the first embodiment of the present invention, when sulfuric acid containing nitric acid is used as a raw material, it is preferred that the nitric acid content of the sulfuric acid is about 10 to 5,000 ppm. In this case, when the nitric acid content is smaller than about 10 ppm, it is difficult to obtain a satisfactory reaction promotion effect. On the other hand, a nitric acid content larger than 5,000 ppm is disadvantageous from an economical point of view.

When using the sulfuric acid containing nitric acid, nitric acid may be further added to the reaction system.

In the first embodiment of the present invention, by adding nitric acid to the reaction system, the reactivity of sulfuric acid can be improved. Therefore, the reaction is efficiently promoted at a low temperature in a short time, even when using sulfuric acid having a low concentration, as compared to the reaction in a conventional method. Complete elucidation of the mechanisms of the reaction promotion has not yet been made, but it is presumed that a reaction: $H_2SO_4 + HNO_3 \rightarrow NO^{2+} + HSO_4^-$ contributes to the promotion of the reaction in the formation of aluminum sulfate.

As mentioned above, a reaction promotion effect can be obtained by the addition of nitric acid to the reaction system, and, further, the heat of hydration caused by sulfuric acid and water and the reaction heat caused by sulfuric acid and aluminum can be utilized for the reaction. Therefore, a heating source for heating the reaction system is not particularly needed. For this reason, the reaction temperature is started from room temperature immediately after charging the starting materials and elevated to about 60 to 110° C. due to the heat of hydration and the reaction heat, then the resultant reaction mixture is matured at that temperature, and thus the desired aluminum sulfate can be obtained efficiently. If desired, forced heating using, for example, steam may be performed.

The reaction time is generally about 1 minute to 1 hour. The period of time of adding dropwise a raw material to the reaction system may be about 1 to 20 minutes (generally, about 5 minutes), and the maturing time may be about 1 to 20 minutes (generally, about 5 minutes), but these can be changed depending on the reaction temperature and other conditions for the reaction.

It is preferred that the amount of the aluminum hydroxide used is about a 1.0 to 1.2-fold molar amount, relative to the mole of sulfuric acid.

For further improving the efficiency of the above reaction, hydrogen peroxide solution may be added to the reaction system.

After completion of the reaction, the resultant reaction mixture may be either diluted with water so that the concentration is adjusted to be a predetermined value to obtain a product in a liquid form or placed on a setting bed and cooled until the mixture is completely set and then ground and packaged to obtain a packaged product.

According to the first embodiment of the present invention, in the preparation of aluminum sulfate by subjecting sulfuric acid and aluminum hydroxide to a reaction, by advancing the reaction in the presence of nitric acid, the reaction efficiency and the throughput capacity as well as the reaction rate are improved, so that the reaction proceeds at a lower temperature. Therefore, not only can an energy savings be achieved, but also waste sulfuric acid having a lower concentration can be utilized as a raw material, thus enabling the promotion of saving materials and the effective utilization of waste materials.

The industrial composition of the first embodiment of the present invention includes any compositions comprising the aluminum sulfate prepared by the method for preparing aluminum sulfate of the first embodiment of the present invention.

The industrial composition of the first embodiment of the present invention can be used as a wastewater treatment agent, a paper sizing agent, a tanning agent for hides, a clarifying agent for fats and oils, and a variety of catalysts in accordance with the known method.

The industrial composition of the first embodiment of the present invention can be used in a conventional waste treatment apparatus.

According to the second embodiment of the present invention, if desired, aluminum sulfate can be prepared from the above-mentioned sulfuric acid, aluminum hydroxide, and peroxide, e.g., hydrogen peroxide solution as raw materials, in the presence of other additives, for example, water, in the reaction system. The reaction may be conducted in accordance with substantially the same procedure as in the known method for preparing aluminum sulfate, except that a peroxide, such as hydrogen peroxide solution, is present in the reaction system, and aluminum hydroxide in the form of powder or in the form of slurry in water may be added to sulfuric acid. Alternatively, sulfuric acid may be added to a slurry of aluminum hydroxide and water. A peroxide, such as hydrogen peroxide solution, may be added to the reaction system either before initiating the reaction or during the reaction. Alternatively, a peroxide, such as hydrogen peroxide solution, may be preliminarily added to sulfuric acid, water, or a slurry of aluminum hydroxide and water and then used. In the second embodiment of the present invention, it is preferred that the reaction is advanced while adding dropwise sulfuric acid to a mixture of aluminum hydroxide and a peroxide, such as hydrogen peroxide solution, while stirring.

The amount of the peroxide, e.g., hydrogen peroxide solution, added to the reaction system may be about 0.1% by weight or more, based on the weight of the reaction system (before being diluted with water). When the amount of the peroxide, e.g., hydrogen peroxide solution, added is smaller than about 0.1% by weight, it is difficult to obtain a satisfactory reaction promotion effect. On the other hand, an excess of the peroxide is disadvantageous from an economical point of view.

In the second embodiment of the present invention, when sulfuric acid containing a peroxide, e.g., hydrogen peroxide solution is used as a raw material, it is preferred that the content of the peroxide, e.g., hydrogen peroxide solution, in the sulfuric acid is about 0.2% by weight or more. In this case, when the peroxide content is smaller than about 0.2% by weight, it is difficult to obtain a satisfactory reaction promotion effect. On the other hand, an excess peroxide content is disadvantageous from an economical point of view.

When using sulfuric acid containing a peroxide, such as hydrogen peroxide solution, a peroxide, e.g., hydrogen peroxide solution, may be further added to the reaction system.

By advancing the reaction in the presence of a peroxide, such as hydrogen peroxide solution, in the reaction system, a decomposition reaction of the peroxide, ($H_2O_2 \rightarrow H_2O + 1/2 O_2\uparrow + 98.4$ kJ when the peroxide is hydrogen peroxide) is induced during the reaction, and contributes to the elevation of the temperature of the reaction system. Thus, not only can the reaction rate be improved, but also the reaction can be completed without using a heating source. For this reason, the reaction temperature is started from room temperature immediately after charging the starting materials and elevated to about 70 to 110° C. due to the heat of hydration caused by sulfuric acid and water, the reaction heat caused by sulfuric acid and aluminum hydroxide, and the heat of decomposition of hydrogen peroxide solution, and then the resultant reaction mixture is maintained or matured at that temperature, and the thus desired aluminum sulfate can be efficiently obtained.

For further improving the efficiency of the above reaction, nitric acid, fuming nitric acid, or waste liquid containing these may be added to the reaction system.

The reaction time is generally about 1 minute to 1 hour. The period of time of adding dropwise a raw material to the reaction system may be about 1 to 20 minutes, and the maturing time may be generally about 1 to 20 minutes.

It is preferred that the amount of the aluminum hydroxide used is about a 1.0 to 1.2-fold molar amount, relative to the mole of sulfuric acid.

After completion of the reaction, the resultant reaction mixture may be either diluted with water so that the concentration is adjusted to be a predetermined value to obtain a product in a liquid form or placed on a setting bed and cooled until the mixture is completely set and then ground and packaged to obtain a packaged product.

According to the second embodiment of the present invention, in the preparation of aluminum sulfate by subjecting sulfuric acid and aluminum hydroxide to a reaction, by advancing the reaction in the presence of a peroxide, such as hydrogen peroxide solution, the reaction efficiency and the throughput capacity as well as the reaction rate are improved, so that the reaction proceeds at a lower temperature. Therefore, not only can energy savings be achieved, but also waste sulfuric acid having a lower concentration can be utilized as a raw material, thus enabling the promotion of saving of materials and the effective utilization of waste materials.

The industrial composition of the second embodiment of the present invention includes any compositions comprising the aluminum sulfate prepared by the method for preparing aluminum sulfate of the second embodiment of the present invention.

The industrial composition of the second embodiment of the present invention can be used as a wastewater treatment agent, a paper sizing agent, a tanning agent for hides, a clarifying agent for fats and oils, and a variety of catalysts in accordance with the known method.

The industrial composition of the second embodiment of the present invention can be used in a conventional waste treatment apparatus.

The aluminum sulfate used in the third embodiment of the present invention may be either in a liquid form or in a powder form prepared in accordance with the known method for preparing aluminum sulfate. With respect to the quality, the aluminum sulfate may be of industrial grade (industrial standards: JIS K1423-1970; tap water standards: JIS K1450-1977) or a reagent grade, or crude aluminum sulfate prepared using spent waste sulfuric acid or waste aluminum hydroxide.

The industrial composition of the third embodiment of the present invention can be easily prepared by mixing together nitric acid and aluminum sulfate. The composition of the third embodiment, generally, further comprises water. In the composition of the third embodiment, aluminum sulfate is present in the form of liquid aluminum sulfate. Therefore, the liquid aluminum sulfate is constituted by water and aluminum sulfate present in the composition.

According to the third embodiment of the present invention, by allowing nitric acid to be present in aluminum sulfate, the aluminum sulfate is improved in aggregation properties; and it is desired that the industrial composition has a nitric acid content of about 10 to 2,000 ppm, based on the weight of the aluminum sulfate, in terms of liquid aluminum sulfate $\{Al_2O_3$ content: 8% by weight; $Al_2(SO_4)_3$ content: 26.8% by weight$\}$. When the nitric acid content is smaller than about 10 ppm, an improvement of the aggregation effect cannot be expected. On the other hand, a nitric acid content larger than about 2,000 ppm is disadvantageous from an economical point of view. Nitric acid in a predetermined amount as it is may be added to the liquid aluminum sulfate or nitric acid that is mixed into aluminum sulfate during the preparation of the aluminum sulfate mentioned above or that is contained in the raw materials for aluminum sulfate (e.g., sulfuric acid) may be utilized.

The composition of the third embodiment of the present invention also can be easily prepared by a method which comprises subjecting sulfuric acid and aluminum hydroxide to a reaction in the presence of nitric acid.

In the above method, the amount of the nitric acid added to the reaction system may be about 1 to 3,000 ppm, preferably about 10 to 1,000 ppm, based on the weight of the reaction system. When the amount of the nitric acid added is smaller than about 1 ppm, it is difficult to obtain a satisfactory reaction promotion effect. On the other hand, an amount of the nitric acid added larger than 3,000 ppm is disadvantageous from an economical point of view.

In the third embodiment of the present invention, when sulfuric acid containing nitric acid is used as a raw material, it is preferred that the nitric acid content of the sulfuric acid is about 10 to 5,000 ppm. In this case, when the nitric acid content is smaller than about 10 ppm, it is difficult to obtain a satisfactory reaction promotion effect. On the other hand, a nitric acid content larger than 5,000 ppm is disadvantageous from an economical point of view.

When using sulfuric acid containing nitric acid, nitric acid may be further added to the reaction system.

In the third embodiment of the present invention, by adding nitric acid to the reaction system, the reactivity of sulfuric acid can be improved. Therefore, the reaction is efficiently promoted at a low temperature in a short time, even when using sulfuric acid having a low concentration, as compared to the reaction in a conventional method. Complete elucidation of the mechanisms of the reaction promotion has not yet been made, but, it is presumed that a reaction: $H_2SO_4 + HNO_3 \rightarrow NO^{2+} + HSO_4^-$ contributes to the promotion of the reaction in the formation of aluminum sulfate.

As mentioned above, a reaction promotion effect can be obtained by the addition of nitric acid to the reaction system, and, further, the heat of hydration caused by sulfuric acid and water and the reaction heat caused by sulfuric acid and aluminum can be utilized for the reaction. Therefore, a heating source for heating the reaction system is not particularly needed. For this reason, the reaction temperature is started from room temperature immediately after charging the starting materials and elevated to about 60 to 110° C. due to the heat of hydration and the reaction heat, and then the resultant reaction mixture is matured at that temperature, and the thus-desired aluminum sulfate can be obtained efficiently. If desired, forced heating using, for example, steam may be performed.

The reaction time is generally about 1 minute to 1 hour. The period of time of adding dropwise a raw material to the reaction system may be about 1 to 20 minutes (generally, about 5 minutes), and the maturing time may be about 1 to 20 minutes (generally, about 5 minutes), but these can be changed depending on the reaction temperature and other conditions for the reaction.

In the third embodiment of the present invention, it is preferred that the amount of the aluminum hydroxide used is about a 1.0 to 1.2-fold molar amount, relative to the mole of sulfuric acid.

For further improving the efficiency of the above reaction, hydrogen peroxide solution may be added to the reaction system.

After completion of the reaction, the resultant reaction mixture may be either diluted with water so that the concentration is adjusted to be a predetermined value to obtain a product in a liquid form or placed on a setting bed and cooled until the mixture is completely set and then ground to obtain a composition of the third embodiment of the present invention.

The thus-obtained industrial composition comprising nitric acid and aluminum sulfate can be used as a wastewater treatment agent like the conventional aluminum sulfate or PAC.

It is presumed that, when nitric acid is present in aluminum sulfate, sulfuric acid ions are likely to associate with nitric acid ions, and hence the sulfuric acid ions are unlikely to associate with aluminum ions to increase the ionic strength of aluminum, thus improving the effect of adsorbing particles suspended in wastewater. For this reason, nitric acid enables an industrial composition comprising aluminum sulfate to be used as a treatment agent, such as a wastewater treatment agent, having aggregation performance comparable to or more excellent than that of PAC.

Like the conventional composition containing aluminum sulfate, the industrial composition of the third embodiment of the present invention can be used in the industrial fields not only as a wastewater treatment agent but also as a paper sizing agent, a tanning agent for hides, a clarifying agent for fats and oils, and a variety of catalysts.

The industrial composition of the third embodiment of the present invention can be use in a conventional waste treatment apparatus.

EXAMPLES

Hereinbelow, the first embodiment of the present invention will be described in more detail with reference to the following Examples, which should not be construed as limiting the scope of the present invention. With respect to aluminum sulfate, a quantitative analysis of aluminum oxide was conducted in accordance with the method described in JIS K1450-1996.

18 g of water and 9.8 g of powdery aluminum hydroxide (reagent grade, manufactured and sold by Wako Pure Chemical Industries, Ltd., Japan) were charged into a reactor having an external wall coated with a heat insulating material and having an agitator, and stirred, and to the resultant mixture was added dropwise 22.5 g of sulfuric acid having a concentration of 80% by weight (prepared by adjusting the concentration of sulfuric acid of reagent grade, manufactured and sold by Wako Pure Chemical Industries, Ltd., Japan, to be 80% by weight) at room temperature over 5 minutes while stirring. After completion of the addition of sulfuric acid, the resultant mixture was matured for 5 minutes, and then, the reaction mixture was diluted with 28 g of water. The diluted reaction mixture was subjected to filtration using a filter to remove the unreacted aluminum hydroxide, thus preparing aluminum sulfate.

Example 1 of the First Embodiment

A reaction was conducted in substantially the same manner as in the above-mentioned method except that 0.05 g of nitric acid having a concentration of 70% by weight (for industrial use) was added to the reactor before starting the addition of sulfuric acid.

Example 2 of the First Embodiment

A reaction was conducted in substantially the same manner as in the above-mentioned method except that waste sulfuric acid from semiconductor plants (concentration: 80% by weight) containing 300 ppm of nitric acid was used instead of the sulfuric acid.

Example 3 of the First Embodiment

A reaction was conducted in substantially the same manner as in Example 1 except that waste sulfuric acid from semiconductor plants (concentration: 80% by weight) containing 0.2% by weight of hydrogen peroxide solution was used instead of the sulfuric acid.

Example 4 of the First Embodiment

A reaction was conducted in substantially the same manner as in the above-mentioned method except that 0.05 g of waste fuming nitric acid, which had been used as a resist removing agent in semiconductor plants, was added to the reaction mixture upon diluting the reaction mixture with water, and then the resultant mixture was matured for 10 minutes utilizing heat inertia.

Comparative Example 1 of the First Embodiment

Aluminum sulfate prepared by the above-mentioned method was taken as Comparative Example 1.

Comparative Example 2 of the First Embodiment

A reaction was conducted in substantially the same manner as in the above-mentioned method except that the reaction mixture diluted with water was matured for 10 minutes utilizing heat inertia.

With respect to each of the Examples 1 to 4 and Comparative Examples 1 and 2 of the first embodiment of the present invention, after completion of the addition of sulfuric acid, the reaction mixture was evaluated with respect to temperature, pH, and $Al_2O_3$ content (% by weight), and the results are shown in Table 1.

TABLE 1

| Sample No. | | Temperature (° C.) of reaction mixture | pH | $Al_2O_3$ Content (% by weight) |
| --- | --- | --- | --- | --- |
| Example | 1 | 92 | 3.33 | 8.10 |
| | 2 | 95 | 3.12 | 8.06 |
| | 3 | 97 | 3.29 | 8.14 |
| | 4 | — | 3.01 | 8.01 |
| Comparative Example | 1 | 85 | 2.2 | 6.85 |
| | 2 | — | 2.4 | 7.04 |

As can be seen from the results shown in Table 1, in each of the Examples 1 to 4 of the first embodiment of the present invention in which nitric acid is present in the reaction system, the efficiency of the reaction and the yield of aluminum oxide are improved, as compared to those in Comparative Examples 1 and 2. In addition, even when using waste sulfuric acid, the yield of aluminum oxide is improved. Further, it is found that, when hydrogen peroxide solution is added to the reaction system, the yield of aluminum oxide is further improved.

Next, the second embodiment of the present invention will be described in more detail with reference to the following Examples, which should not be construed as limiting the scope of the present invention. With respect to the aluminum sulfate, a quantitative analysis of aluminum oxide was conducted in accordance with the method described in JIS K1450-1996.

18 g of water and 9.8 g of powdery aluminum hydroxide (reagent grade, manufactured and sold by Wako Pure Chemical Industries, Ltd., Japan) were charged into a reactor having an external wall coated with a heat insulating material and having an agitator, and stirred, and to the resultant mixture was added dropwise 22.5 g of sulfuric acid having a concentration of 80% by weight (prepared by adjusting the concentration of sulfuric acid of reagent grade, manufactured and sold by Wako Pure Chemical Industries, Ltd., Japan, to be 80% by weight) at room temperature over 5 minutes while stirring. After completion of the addition of sulfuric acid, the resultant mixture was matured for 5 minutes, and then, the reaction mixture was diluted with 28 g of water. The diluted reaction mixture was subjected to filtration using a filter to remove the unreacted aluminum hydroxide, thus preparing aluminum sulfate.

Example 1 of the Second Embodiment

A reaction was conducted in substantially the same manner as in the above-mentioned method except that 1.0 g of hydrogen peroxide solution having a concentration of 30% by weight (for industrial use) was added to the reactor before starting the addition of sulfuric acid.

Example 2 of the Second Embodiment

A reaction was conducted in substantially the same manner as in the above-mentioned method except that waste sulfuric acid from semiconductor plants (concentration: 80% by weight) containing 0.2% by weight of hydrogen peroxide solution was used instead of the sulfuric acid.

Example 3 of the Second Embodiment

A reaction was conducted in substantially the same manner as in Example 2 except that 0.05 g of nitric acid having a concentration of 70% by weight (for industrial use) was added to the reaction system before starting the addition of sulfuric acid.

Example 4 of the Second Embodiment

A reaction was conducted in substantially the same manner as in Example 2 except that hydrogen peroxide solution having a concentration of 30% by weight and water were added to sulfuric acid having a concentration of 98% by weight so that the sulfuric acid concentration and the hydrogen peroxide solution concentration became 80% by weight and 0.5% by weight, respectively.

Comparative Example of the Second Embodiment

Aluminum sulfate prepared by the above-mentioned method was taken as the Comparative Example.

With respect to each of Examples 1 to 4 and the Comparative Example of the second embodiment of the present invention, after completion of the addition of sulfuric acid, the reaction mixture was evaluated with respect to temperature, pH, and $Al_2O_3$ content (% by weight), and the results are shown in Table 2.

TABLE 2

| Sample No. | | Temperature (° C.) of reaction mixture | pH | $Al_2O_3$ Content (% by weight) |
|---|---|---|---|---|
| Example | 1 | 99 | 3.33 | 8.18 |
|  | 2 | 93 | 3.10 | 8.04 |
|  | 3 | 97 | 3.29 | 8.14 |
|  | 4 | 98 | 3.30 | 8.15 |
| Comparative Example | | 85 | 2.2 | 6.85 |

As can be seen from the results shown in Table 2, in each of Examples 1 to 4 of the second embodiment of the present invention in which hydrogen peroxide solution is present in the reaction system, the efficiency of the reaction and the yield of aluminum oxide are improved, as compared to those in the Comparative Example. In addition, even when using waste sulfuric acid, the yield of aluminum oxide is improved. Further, it is found that, when nitric acid is added to the reaction system, the yield of aluminum oxide is further improved.

Next, the third embodiment of the present invention will be described in more detail with reference to the following Examples, which should not be construed as limiting the scope of the present invention. With respect to the aluminum sulfate, a quantitative analysis of aluminum oxide was conducted in accordance with the method described in JIS K1450-1996.

Example 1 of the Third Embodiment

Aluminum sulfate for tap water described in Comparative Example 1 below, containing 500 ppm of nitric acid for industrial use (concentration: 70% by weight), was taken as Example 1.

Example 2 of the Third Embodiment 18 g of water, 9.8 g of powdery aluminum hydroxide (reagent grade), and 0.05 g of nitric acid having a concentration of 70% by weight (for industrial use) were charged into a reactor having an external wall coated with a heat insulating material and having an agitator, and stirred, and to the resultant mixture was added dropwise 22.5 g of sulfuric acid having a concentration of 80% by weight at room temperature over 5 minutes while stirring. After completion of the addition of sulfuric acid, the resultant mixture was matured for 5 minutes, and then, the reaction mixture was diluted with 28 g of water. The diluted reaction mixture was subjected to filtration using a filter to remove the unreacted aluminum hydroxide. With respect to the resultant product, pH and $Al_2O_3$ content (% by weight) were measured. The product had a pH of 3.33 and an $Al_2O_3$ content (% by weight) of 8.10.

Example 3 of the Third Embodiment

A reaction was conducted in substantially the same manner as in Example 2, except that the nitric acid was not used, and waste sulfuric acid from semiconductor plants (concentration: 80% by weight) containing 300 ppm of nitric acid was used instead of the sulfuric acid. The reaction mixture finally obtained had a pH of 3.12 and an $Al_2O_3$ content (% by weight) of 8.14.

Comparative Example 1 of the Third Embodiment

Aluminum sulfate for tap water ($Al_2O_3$: 8% by weight) was taken as Comparative Example 1. The aluminum sulfate had a pH of 3.10 and an $Al_2O_3$ content (% by weight) of 8.10.

Comparative Example 2 of the Third Embodiment

PAC for waste treatment (polyaluminum chloride for industrial use; alumina: 10% by weight) was taken as Comparative Example 2.

The above-obtained five samples were compared and evaluated with respect to the aggregation effect using wastewater from semiconductor plants. The wastewater contained 30 ppm of F ions (which further contained sulfuric acid, nitric acid, and hydrochloric acid), and calcium hydroxide was added to the wastewater to form a suspension having a pH of 8.7. A comparison was made between the suspensions containing each sample and the suspensions containing each sample and a polymer flocculant (polyacrylamide flocculant) with respect to the aggregation rate, the turbidity, and the F ion concentration. The aggregation rate was evaluated visually by measuring the period of time during which sediment passed through within a predetermined range in a sedimentation tube. The turbidity of the wastewater was measured using a portable turbidity meter, PC-06, manufactured and sold by KYOTO ELECTRONICS CO., LTD., Japan, and the F ion concentration of the wastewater was measured using ILO-30, manufactured and sold by DKK Corporation, Japan.

With respect to each of Examples 1 to 3 and Comparative Examples 1 and 2 of the third embodiment of the present invention, the results of the evaluation of the aggregation rate, turbidity, and F ion concentration are illustrated in FIGS. 1 to 3.

As is apparent from the results shown in FIG. 1, in each of Examples 1 to 3 of the third embodiment of the present invention in which nitric acid is present in the aluminum sulfate, the aggregation rate is more excellent than those in Comparative Examples 1 and 2. Further, it is found that the larger the amount of the sample added, the more excellent the aggregation rate.

As is apparent from the results shown in FIG. 2, in each of Examples 1 to 3 of the third embodiment of the present invention in which nitric acid is present in the aluminum sulfate, the turbidity is more remarkably lowered than those in Comparative Examples 1 and 2. In addition, it is found that, when a polymer flocculant is further added to the wastewater, the turbidity is further lowered.

As is apparent from the results shown in FIG. 3, in each of Examples 1 to 3 of the third embodiment of the present invention in which nitric acid is present in the aluminum sulfate, the F ion concentration is more remarkably lowered than those in Comparative Examples 1 and 2. In addition, it is found that, when a polymer flocculant is further added to the wastewater, the F ion concentration is further lowered.

Finally, the embodiments described above are only examples of the present invention. It should be noted that the present invention is not restricted only to such embodiment, and various modifications, combinations and sub-combinations of the embodiments or parts of the embodiments in accordance with its design or the like may be made without departing from the scope of the present invention.

The invention claimed is:

1. A method for preparing aluminum sulfate comprising:
    subjecting sulfuric acid and aluminum hydroxide to reaction, and
    advancing said reaction in the presence of nitric acid and a peroxide.

2. The method according to claim 1, wherein said peroxide is hydrogen peroxide.

3. The method according to claim 2, wherein said hydrogen peroxide is hydrogen peroxide solution.

4. The method according to claim 3, wherein said hydrogen peroxide solution is present in the reaction system in an amount of 0.1% by weight or more, based on the weight of the reaction system.

5. The method according to claim 3, wherein said sulfuric acid contains 0.2% by weight or more of hydrogen peroxide solution and said aluminum hydroxide are subjected to said reaction.

6. The method according to claim 3, wherein said hydrogen peroxide solution is spent hydrogen peroxide solution.

7. The method according to claim 2, wherein said sulfuric acid is sulfuric acid having a concentration of 50 to 90% by weight.

8. The method according to claim 2, wherein said sulfuric acid is spent sulfuric acid.

9. The method according to claim 2, wherein said aluminum hydroxide is spent aluminum hydroxide.

10. The method according to claim 1, wherein said sulfuric acid is concentrated sulfuric acid having a concentration of 50 to 90% by weight.

11. The method according to claim 1, wherein said sulfuric acid is spent sulfuric acid.

12. The method according to claim 1, wherein said aluminum hydroxide is spent aluminum hydroxide.

13. A method for improving a yield of aluminum sulfate in preparation of aluminum sulfate from sulfuric acid and aluminum hydroxide, wherein said method comprises:
    adding nitric acid and hydrogen peroxide solution to a reaction system comprising said sulfuric acid and said aluminum hydroxide.

14. A method for for improving an efficiency of preparation of aluminum sulfate, the method comprising:
    subjecting sulfuric acid and aluminum hydroxide to reaction, and
    advancing said reaction in the presence of nitric acid and a peroxide.

* * * * *